(12) United States Patent
Mahapatra

(10) Patent No.: US 9,602,970 B1
(45) Date of Patent: Mar. 21, 2017

(54) MODIFYING GEOFENCE BOUNDARIES

(71) Applicant: Amazon Technologies, Inc., Seattle, WA (US)

(72) Inventor: Abinash Mahapatra, Cupertino, CA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 0 days.

(21) Appl. No.: 14/713,526

(22) Filed: May 15, 2015

(51) Int. Cl.
*H04W 24/00* (2009.01)
*H04W 4/02* (2009.01)
*H04M 11/00* (2006.01)
*H04W 4/00* (2009.01)

(52) U.S. Cl.
CPC .................. *H04W 4/022* (2013.01)

(58) Field of Classification Search
CPC ....... H04W 24/00; H04W 4/02; H04W 60/00; H04W 4/00; H04M 1/72516; H04M 11/00

USPC ....................................................... 455/456.3
See application file for complete search history.

(56) References Cited

U.S. PATENT DOCUMENTS

2014/0370910 A1* 12/2014 Natucci, Jr. ........... H04W 4/022
   455/456.1
2015/0176998 A1* 6/2015 Huang .................... G01C 21/20
   701/400

\* cited by examiner

*Primary Examiner* — Huy C Ho
(74) *Attorney, Agent, or Firm* — K&L Gates LLP

(57) ABSTRACT

Various examples are directed to systems and methods for modifying a geofence boundary. A geofence engine may receive an indication of an initial geofence boundary for a first mobile device. The geofence engine may also receive geofence data from a second mobile device and a third mobile device. The geofence data may describe a plurality of geofence boundaries and a plurality of geofence boundary breach events associated with the plurality of geofence boundaries. The geofence engine may also determine an alternate geofence boundary for the first mobile device based at least in part on the geofence data.

20 Claims, 10 Drawing Sheets

MODIFYING GEOFENCE BOUNDARIES

BACKGROUND

Geofencing is a way that modern software applications can respond to the geographic location of one or more users. A user carries a mobile device that can be located using a Global Positioning System (GPS) or any other suitable location mechanism. Often, the user sets a geofence boundary around a point-of-interest (POI) such as a home, an office, a retail location, etc. The mobile device detects when the user crosses a geofence boundary and takes a responsive action. For example, the geofence boundary may be around the user's home. When the user crosses the geofence boundary, the mobile device may initiate a responsive action in the user's home such as, turning on a light, raising or lowering a thermostat, etc.

The performance of a geofence application depends on the ability to accurately determine when a user (and his or her mobile device) crosses a geofence boundary. If the geofence application is not alerted when the user crosses a geofence boundary, or the alert is delayed, the responsive action may be delayed or not taken at all. In many places, however, it is difficult to accurately find a user's geographic location and, therefore, difficult to determine when the user crosses a geofence boundary. For example, clusters of tall buildings or other objects can obstruct GPS or cellular network signals.

DETAILED DESCRIPTION

Figure 1:
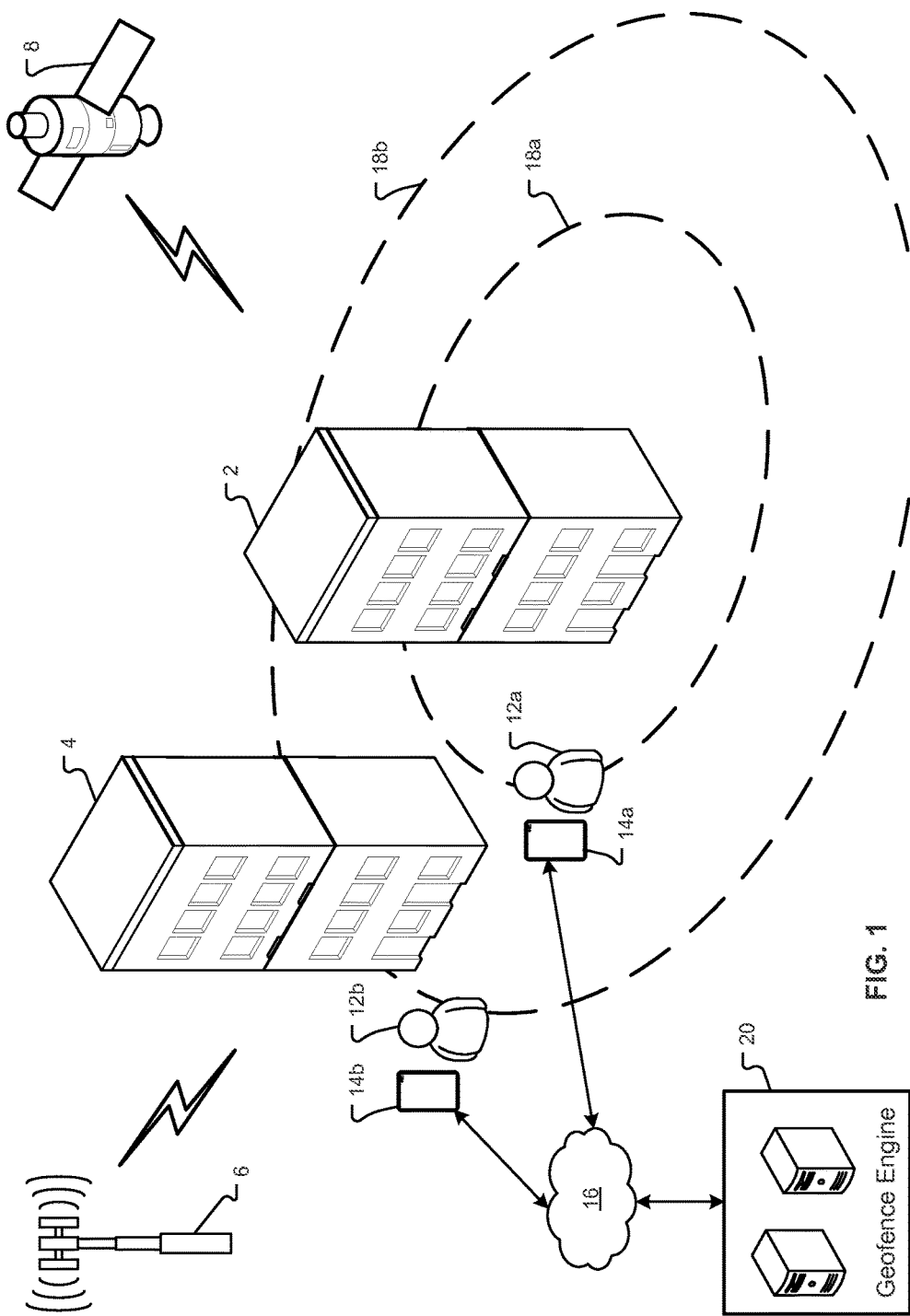
FIG. 1 is a diagram showing one example of an environment for modifying geofence boundaries.

In the following description, reference is made to the accompanying drawings which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

The systems and methods described herein are directed to modifying geofence boundaries based on geofence data describing a pool of mobile devices (and associated users). For example, the systems and methods described herein may apply crowdsourcing to geofence data to modify geofence boundaries, increasing the likelihood that geofence boundary breaches will be detected. A geofence engine may collect and store geofence data from the pool of mobile devices. The geofence data may include, for example, points-of-interest (POIs) and corresponding geofence boundaries. The geofence data may also include geofence boundary breach data. Geofence boundary breach data may describe instances where a mobile device (e.g., in the possession of a user) crossed or breached a geofence boundary. Geofence boundary breach data may include various performance metrics describing a breach event. Performance metrics may include, for example, a response time and a detection distance. The response time may describe a time between when the user crossed the geofence boundary and when the crossing was detected. The detection distance may indicate how far the user traveled beyond the geofence boundary before the breach was detected. Different values for performance metrics may indicate superior or inferior performance of a geofence boundary. For example, when the performance metric is a response time, a shorter response time may indicate superior performance relative to a longer response time. Also, for example, when the performance metric is a detection distance, a shorter detection distance may indicate superior performance relative to a longer detection distance.

The geofence engine may utilize the geofence data to evaluate geofence boundaries for mobile devices and/or to modify geofence boundaries for mobile devices (e.g., improved geofence boundaries). In some examples, the geofence engine receives an initial geofence boundary for a mobile device, the initial geofence boundary around an initial POI. The initial geofence boundary may be selected, for example, by a user of the mobile device. The geofence engine may identify from the geofence data reference geofence data, including, for example, a plurality of reference geofence boundaries and a plurality of reference POIs. Each reference geofence boundary may have a reference POI equivalent to the initial POI. The geofence engine may use the reference geofence boundaries to evaluate a predicted performance of the initial geofence boundary. For example, the geofence engine may identify reference geofence boundaries that are equivalent to the initial geofence boundary. The predicted performance of the initial geofence boundary may be the same or similar to the observed performance of the equivalent reference geofence boundary or boundaries. Observed performance may include, for example, observed response times and/or observed detection distances for breach events involving the boundary or boundaries. The predicted performance may be expressed, for example, as a response time and/or a detection distance. In some examples the geofence engine may use the reference geofence boundaries to select an improved geofence boundary. For example, the improved geofence boundary may have performance that is superior to the performance of the initial geofence boundary (e.g., the improved geofence boundary may produce shorter response times, shorter detection distances, etc.) For example, the improved geofence boundary may be a boundary selected from the reference geofence boundaries that has the highest performance and/or a performance greater than that of the initial geofence boundary.

In some examples, the geofence engine may utilize geofence data to generate a performance map for a geographic area. The performance map may indicate expected geofence boundary performance for a plurality of locations in the geographic area. For example, the geofence engine may evaluate geofence boundary breach data selected from the geofence data, including, for example, a location of each geofence boundary breach and performance metrics describing the breach (e.g., a response time and/or detection distance). Locations on the performance map where a previous breach event has occurred may have an expected performance based on the observed performance of the breach events. In some examples, the geofence engine may extrapolate expected performance for other locations in the geographic area, for example, utilizing any suitable extrapolation technique.

FIG. 1 is a diagram showing one example of an environment 10 for modifying geofence boundaries. The environment 10 includes example users 12a, 12b. The users 12a, 12b may carry respective mobile devices 14a, 14b. The mobile devices 14a, 14b may be any sort of device that can have its location determined, either by the device itself or by a third party device or system. For example, mobile devices 14a, 14b may be equipped with a Global Positioning System (GPS) receiver configured to communicate with one or more GPS satellites 8 in order to determine the locations of the respective mobile devices 14a, 14b. Also, in some examples, mobile devices 14a, 14b, may be equipped with a wireless mobile network transceiver to communicate with a mobile network 6. The mobile network 6 may be configured use triangulation or any other suitable technique to determine the location of the device. Example mobile devices 14a, 14b that may be used in the environment 10 include smart phones, laptop computers, tablet computers, wearables, etc.

The environment 10 may also comprise a geofence engine 20. The geofence engine 20 may comprise one or more computing devices, such as one or more servers, configured to modify geofence boundaries, for example, as described herein. The computing device or devices of the geofence engine 20, as described herein, may comprise one or more processors and operatively associated memory. The geofence engine 20 may be in communication with the mobile devices 14a, 14b, for example, via a network 16. For example, the geofence engine 20 may collect geofence data from the mobile devices 14a, 14b and use the collected geofence data to modify geofence boundaries, as described herein. Additional description of the network 16 is provided herein with respect to FIG. 2.

FIG. 1 also shows example geofence boundaries 18a, 18b. For example, geofence boundary 18a may be for the mobile device 14a while geofence boundary 18b may be for the mobile device 14b. In the example of FIG. 1, both geofence boundaries 18a, 18b have POIs in the building 2. Both geofence boundaries 18a, 18b may have the same POI or different, but equivalent POIs. The POI or POIs in the building 2 may be any suitable type of POI, for, example, an office or other place of work, an apartment or other abode, a retail location, etc. The geofence boundaries 18a, 18b illustrated in FIG. 1 are both circles with a constant radius centered on the building 2. (The geofence boundaries 18a, 18b appear ovaloid due to the perspective of FIG. 1.) In various examples, however, the radii of geofence boundaries may vary by direction, for example, as described herein. In some examples, the mobile devices 14a, 14b may send the geofence engine 20 geofence data including, for example, the POI and geofence boundary 18a, 18b for the respective mobile devices 14a, 14b.

In FIG. 1, the mobile devices 14a, 14b (along with their respective users 12a, 12b) are breaching their respective geofence boundaries 18a, 18b. The mobile device 14a tracks its location and determines that it (along with the user 12a) has crossed the geofence boundary 18a. Upon determining that it has crossed the geofence boundary 18a, the mobile device 14a may take a responsive action and/or send an alert indicating that another system (e.g., the geofence engine 20) should take a responsive action. The mobile device 14a may additionally send geofence data to the geofence engine 20 indicating metrics describing its breach of the geofence boundary 18a. The metrics may include a response time and a detection distance. The geofence engine 20 may utilize the geofence data to modify geofence boundaries, as described herein.

Similar to the mobile device 14a, the mobile device 14b may also track its location. As the mobile device 14b (along with the user 12b) crosses its geofence boundary 18b, however, it is shielded from the one or more GPS satellites 8 by the building 4. Accordingly, the mobile device 14b may not be able to accurately determine its own location as it breaches the geofence boundary 18b. As a result, the response time and detection distance for the mobile device 14b may be greater than for the mobile device 14a. For example, the mobile device 14b may not determine that it has crossed the geofence boundary 18a until it is again able to find its location, which may be some time after the breach has occurred (e.g., a response time) or some distance beyond the geofence boundary 18b (e.g., a detection distance). In some examples, the mobile device 14b may fail to recognize a breach event at all. Some missed breach events may be detected after the fact, for example, by the mobile device 14b or the geofence engine 20. For example, after crossing the geofence boundary 18b, the mobile device 14b may interact with another system known to be at the POI and/or within the geofence boundary 18b. In some examples, the mobile device 14b may make a wired connection (e.g., Universal Serial Bus (USB)), or wireless connection (e.g., Bluetooth™, Wi-Fi, etc.) with a device or network known to be within the geofence boundary 18b and/or at the POI. Upon making such a connection, the mobile device 14b may determine that it is within the geofence boundary 18b an that a breach event was missed.

In some examples, the geofence engine 20 may be in communication with the mobile device 14b, for example, to modify the geofence boundary 18b to a boundary with a superior performance. For example, as described herein, the geofence engine 20 may utilize previously-received geofence data to evaluate the performance of the geofence boundary 18b and select an alternate geofence boundary with superior performance (e.g., a geofence boundary that is not obstructed by the building 4 or other obstruction. Superior performance may be indicated, for example, by shorter response times, shorter detection distances, etc. Applying the alternate geofence boundary may improve the likelihood that the mobile device 14b will detect geofence boundary breach events. For example, the geofence engine 20 may increase and/or decrease the radius of the geofence boundary 18b, as described herein, so that the mobile device 14b is not shadowed by the building 4 or subject to another obstruction when crossing it.

The example obstruction shown in FIG. 1 is a building 4. Obstructions, however, may be anything that prevents the mobile devices 14a, 14b from being located with a suitable response time or detection distance. Other examples of obstructions include cloud cover or other unfavorable weather conditions, an unfavorable position of GPS satellites 8 in the sky (e.g., relative to other obstructions), etc. Also, as described herein, the mobile devices 14a, 14b may be located using technologies other than GPS, such as by triangulation performed by a mobile network 6 or Wi-Fi network. When alternate location technologies are used, other types of obstructions may arise. For example, when mobile devices 14a, 14b are located using a mobile network 6, obstructions may appear at locations that are too far from the nearest mobile or cellular tower to allow for accurate location detection.

A suitable response time or detection distance for geofence boundary breach events may be selected in any acceptable manner and may depend on the application. For example, in some applications it may be desirable to maintain a particular detection distance (e.g., 5 meters). If it is expected that a user will breach a geofence boundary in a car, bus or other fast-moving mode of transportation, then, a shorter response time (e.g., 1 second) may be desirable to meet the desired detection distance. If it is expected that the user will breach the geofence boundary on foot a longer response time may be acceptable while maintaining the same detection distance. In some examples, a user may prioritize geofence boundaries based on a desired response time and/or detection distance.

Figure 2:
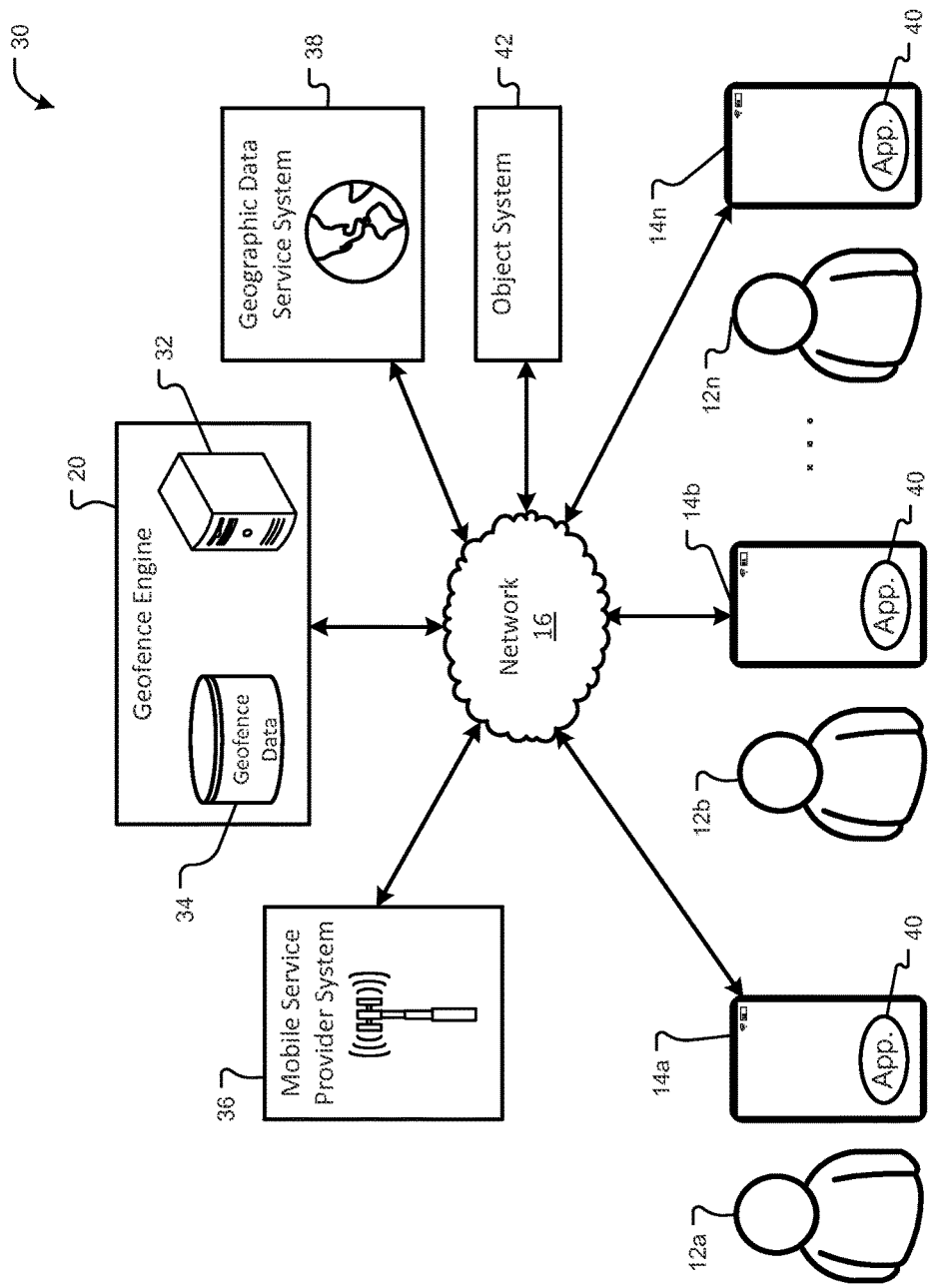
FIG. 2 is diagram showing one example of a network topology for modifying geofence boundaries.

FIG. 2 is diagram showing one example of another environment 30 for modifying geofence boundaries. The environment 30 may include some components in common with the environment 10 described herein, for example, having like reference numbers. The environment 30 comprises the geofence engine 20 along with the network 16, and a pool of mobile devices 14a, 14b, 14n and associated users 12a, 12b, 12n corresponding to the mobile devices 14a, 14b, 14n. Although three mobile devices and users 12a, 12b, 12n are shown in FIG. 2, any suitable number of users 12a, 12b, 12n and mobile devices 14a, 14b, 14n may be used. In some examples, larger numbers of mobile devices and users in the pool may increase the utility of the geofence boundaries determined by the geofence engine 20.

In FIG. 2, the geofence engine 20 is illustrated to include a data store 34 and a server 32. The data store 34 may store geofence data, as described herein. The functions of the geofence engine 20 described herein may be performed by one or more servers, such as the server 32. The various components 32, 34 of the geofence engine 20 may be at a common geographic location and/or may be distributed across multiple geographic locations. For example, the geofence engine 20 may be implemented in whole or in part in a cloud system. The environment 30 may also comprise a mobile service provider system 36. The mobile service provider system 36 may be associated with a mobile network, such as the mobile network 6 shown in FIG. 1.

The mobile service provider system 36 may comprise one or more servers or other computing devices at a common geographic location or distributed across geographic locations. When the location of mobile devices 14a, 14b, 14n is determined in whole or in part by triangulation on the mobile network 6, the mobile service provider system 36 may be involved in the determination. For example, the mobile service provider system 36 may, in whole or in part, determine the location of one or more of the mobile devices 14a, 14b, 14n. The mobile service provider system 36 may communicate the location of one or more mobile devices 14a, 14b, 14n to the mobile devices 14a, 14b, 14n themselves and/or to the geofence engine 20. A geographic data service system 38 may provide the geofence engine 20 with geographic data such as, for example, maps indicating the location of potential POIs such as buildings, houses, etc. The locations indicated by the geographic data service system 38 may include latitude and longitude, street addresses, etc. In some examples, the geographic data service system 38 may also provide the geofence engine 20 with topographic data showing potential geographic obstructions such as hills, mountains, tunnels, etc. In some examples, the geographic data service system 38 may provide the geofence engine 20 with data describing the location of one or more geographic units, described herein. In this way, the geofence engine 20 may determine whether POIs are equivalent by virtue of being part of the same geographic unit. The various components of the environment 30 may be in communication with one another via the network 16. The network 16 may be and/or comprise any suitable wired or wireless network configured according to any suitable architecture or protocol.

The geofence engine 20 and/or the mobile devices 14a, 14b, 14n may monitor the location of the mobile devices 14a, 14b, 14n and determine when a geofence boundary is breached. For example, one or more of the mobile devices may execute a geofence application 40. The geofence application 40 may monitor the location of the mobile device 14a, 14b, 14n executing it in any suitable manner. For example, the geofence application 40 may contact a GPS receiver 142 (FIG. 3), the mobile service provider system 36, and/or any other potential source of location information to determine the location of its mobile device 14a, 14b, 14n. In some examples, the geofence application 40 may also compare the location of its mobile device 14a, 14b, 14n to one or more active geofence boundaries for the executing mobile device.

When the mobile device 14a, 14b, 14n crosses a geofence boundary, the geofence application 40 may initiate a responsive action. The responsive action may be any suitable action. In some examples, the responsive action is or includes displaying a message on the mobile device 14a, 14b, 14n indicating that the geofence boundary has been breached. Also, in some examples, the responsive action could include instructing an object system 42 to perform a task. The object system 42 may include any system or systems that are instructed by geofence application 40 when a geofence boundary is breached. For example, when the responsive action involves turning on lights or modifying the thermostat at the user's home, the object system 42 may be a control system for the home. When the responsive action involves sending an alert to other users, the object system 42 may be a mobile device associated with a receiving user and/or an e-mail server, short message system (SMS) server or other distribution device for distributing a message to one or more other users. Various other types of object systems 42 and responsive actions may be used.

In some examples, the geofence engine 20 may be programmed to determine the location of mobile devices 14a, 14b, 14n, for example, by querying the mobile devices 14a, 14b, 14n and/or by communicating with the mobile service provider system 36 or other source of mobile device location data. The geofence engine 20 may compare the location of each mobile device 14a, 14b, 14n to geofence boundaries for the mobile device and may determine when a breach has occurred. The geofence engine 20 may then take the responsive action. In various examples, determining the location of mobile devices 14a, 14b, 14n, determining when mobile devices have breached a geofence boundary, and/or taking responsive actions may be distributed between the geofence engine 20 and the mobile devices 14*a*, 14*b*, 14*n* in any suitable manner.

Figure 3:
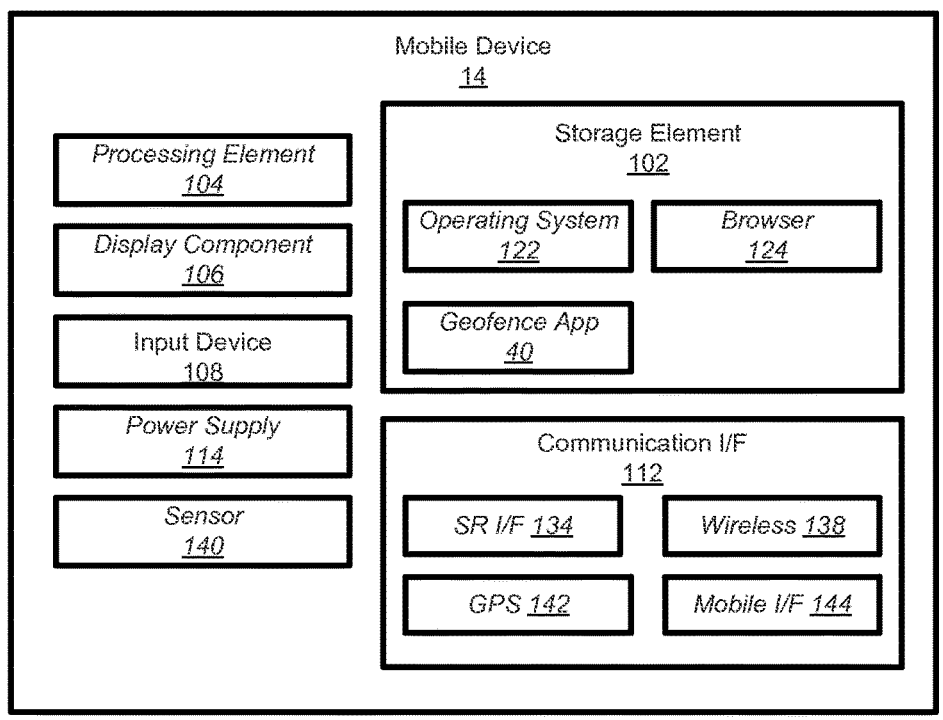
FIG. 3 is a block diagram showing additional details of an example mobile device.

FIG. 3 is a block diagram showing additional details of an example mobile device 14. The example mobile device 14 may represent one or more of the mobile devices 14*a*, 14*b*, 14*n* described herein. In some examples, the mobile device 14 may include a display component 106. The display component 106 may comprise, for example, one or more devices such as cathode ray tubes (CRTs), liquid crystal display (LCD) screens, gas plasma-based flat panel displays, LCD projectors, or other types of display devices, etc. The mobile device 14 may also include one or more processing elements 104 for executing instructions and retrieving data stored in a storage element 102. The storage element 102 can include one or more different types of memory, data storage or computer readable storage media devoted to different purposes within the mobile device 14. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104, such as an operating system 122. Code for executing the geofence application 40, described herein, may be stored at the storage element 102. In some examples, the storage element 102 may also comprise a browser program 124 for execution by the processing element 104. The browser program 124, in some examples, may enable a user of the mobile device 14 to access other components of the environment 10 and environment 30 such as, for example, the geofence engine 20 and/or the object system 42 to configure geofence options related to these or other systems.

The mobile device 14 may also include one or more input devices 108 operable to receive inputs from a user. The input devices 108 can include, for example, a push button, touch pad, touch screen, wheel, joystick, keyboard, mouse, trackball, keypad, accelerometer, light gun, game controller, or any other such device or element whereby a user can provide inputs to the mobile device 14. These input devices 108 may be incorporated into the mobile device 14 or operably coupled to the mobile device 14 via wired or wireless interface. For mobile devices 14 with touch sensitive displays, the input devices 108 can include a touch sensor that operates in conjunction with the display component 106 to permit users to interact with the image displayed by the display component 106 using touch inputs (e.g., with a finger or stylus). The mobile device 14 may also include a power supply 114, such as a wired alternating current (AC) converter, a rechargeable battery operable to be recharged through conventional plug-in approaches, or through other approaches such as capacitive or inductive charging. In some examples, the input devices 108 may comprise a camera or other optical sensor.

The mobile device 14 may also include a communication interface 112, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. Examples of wireless components in the communications interface 112 include, for example, a wireless module 138 configured to communicate utilizing IEEE 802.11 or another suitable wireless local area network (LAN) protocol. A mobile interface 144 may be configured to communicate with a mobile network (such as 6 in FIG. 1) utilizing a cellular or other mobile protocol. A short range interface 134 may be configured to communicate using one or more short range wireless protocols such as, for example, near field communications (NFC), Bluetooth™, Bluetooth LE™, etc. It should be understood that the mobile device 14 may also include one or more wired communications interfaces for coupling and communicating with other devices. A GPS receiver 142 may be configured to communicate with one or more earth-orbiting satellites or other suitable position-determining systems to identify a position of the mobile device 14. The mobile device 14 may also comprise one or more sensors 140 for sensing various aspects of the mobile device 14 and/or its environment. Example sensors 140 that may be included in the mobile device 14 may include, a gyro sensor, an accelerometer, etc.

Figure 4:
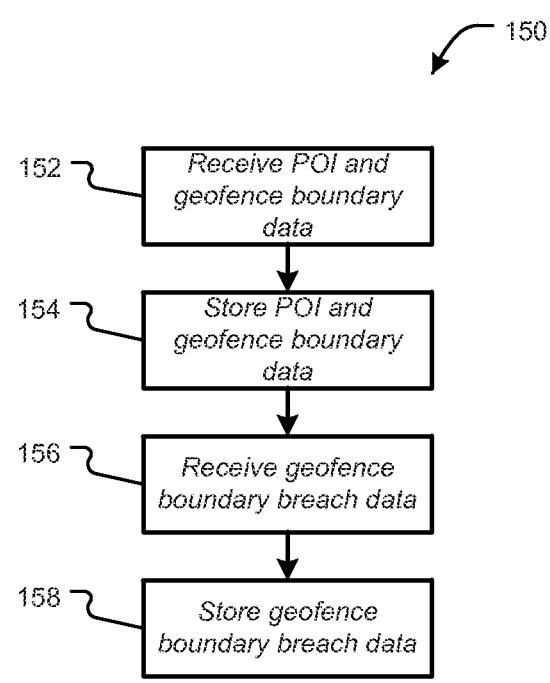
FIG. 4 is a flow chart showing one example of a process flow that may be executed by the geofence engine to receive and store geofence data for evaluating and/or modifying geofence boundaries.

FIG. 4 is a flow chart showing one example of a process flow 150 that may be executed by the geofence engine 20 to receive and store geofence data for evaluating and/or modifying geofence boundaries. At step 152, the geofence engine 20 may receive POI and geofence boundary data from a pool of mobile devices 14*a*, 14*b*, 14*n*. The pool of mobile devices 14*a*, 14*b*, 14*n* may include any suitable number of mobile devices. The received POI and geofence boundary data may be in any suitable format. For example, each POI may be described by a geographic position (e.g., a latitude and longitude). In some examples, geofence boundaries are described with reference to their associated POI. For example, the geofence boundary may be expressed as a radius around the POI. In some examples, the radius of the geofence boundary may vary by direction. Also, in some examples, a geofence boundary may be expressed as a series of points defining any suitable open or closed shape. For example, an open shaped geofence boundary may be implemented by setting the geofence boundary radius to zero for some range of directions. The geofence engine 20 may store the received POI and geofence boundary data at step 154. In some examples, the geofence engine 20 may receive POI and geofence boundary data from the pool of mobile devices continuously. For example, as users 12*a*, 12*b*, 12*n* set geofence boundaries, associated POI and geofence boundary data may be provided to the geofence engine 20.

At step 156, the geofence engine 20 may receive geofence boundary breach data. Geofence boundary breach data may describe a mobile device, such as 14*a*, 14*b*, 14*n*, crossing or breaching a geofence boundary associated with that mobile device. For example, geofence boundary breach data may include an indication of a geofence boundary that has been breached and metrics describing the breach such as, for example, a response time and/or a detection distance. In some examples, the geofence boundary breach data may also include an indication of the POI associated with the geofence boundary and/or an identifier of the mobile device. The geofence engine 20 may store the geofence boundary breach data at step 158.

The geofence engine 20 may receive geofence data in any suitable manner. In some examples, 152 and 154 may be omitted and POI and geofence boundary data may be provided to the geofence engine 20 upon detection of a breach. For example, geofence boundary breach data may include the associated geofence boundary and POI data. Also, in some examples, as described herein, the geofence engine 20 may determine when a mobile device 14*a*, 14*b*, 14n has breached a geofence boundary associated with that mobile device. In these examples, the geofence engine 20 may store geofence boundary breach data when it detects a breach.

Figure 5:
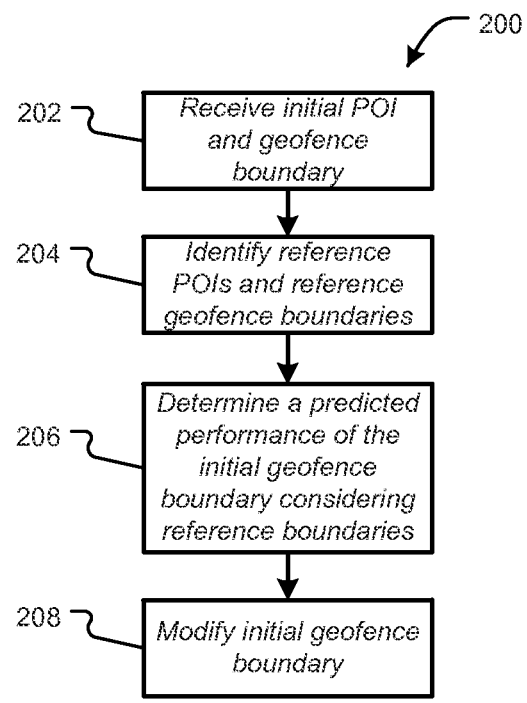
FIG. 5 is a flow chart showing one example of a process flow that may be executed by the geofence engine to modify geofence boundaries.

FIG. 5 is a flow chart showing one example of a process flow 200 that may be executed by the geofence engine 20 to modify geofence boundaries. At step 202, the geofence engine 20 may receive, for a mobile device, an initial POI and an initial geofence boundary positioned around the initial POI. The geofence engine 20 may receive the initial POI and initial geofence boundary at step 202 at any suitable time. In some examples the geofence engine 20 may receive the initial POI and initial geofence boundary before the geofence is applied. In other examples, the geofence engine 20 may receive the initial POI and initial geofence boundary after the geofence is already being applied by the mobile device and/or the geofence engine 20.

At step 204, the geofence engine 20 may identify one or more reference POIs from the geofence data received from the pool of mobile devices (FIG. 4). Each reference POI may have an associated reference geofence boundary that may be received, for example, as described with respect to FIG. 4. Reference POIs may be POIs that are equivalent or similar to the initial POI. Reference geofence boundaries may be geofence boundaries around POIs that are equivalent to the initial POI. POIs that are equivalent to one another may be at the same geographic location or at geographic locations separated by less than a threshold distance. Any suitable threshold distance may be used (e.g., 100 m, 75 m, 50 m, 25 m, etc.). In some examples, POIs may be considered equivalent if they are in a common geographic unit. A geographic unit may be a set of geographic locations within a common boundary such as, for example, a building, a block, a district (e.g., the Financial District in Manhattan), etc. The geofence engine 20 may receive information about which geographic locations are in the same geographic unit, for example, from a geographic data service system 38 (FIG. 2).

At step 206, the geofence engine 20 may determine a predicted performance of the initial geofence boundary considering the performance of the reference boundaries (e.g., identified at step 204). The predicted performance of the initial geofence boundary may include, for example, a predicted response time and/or detection distance. The predicted performance may be determined in any suitable manner. For example, determining the predicted performance may comprise aggregating the observed performance of reference geofence boundaries equivalent to the initial geofence boundary. Equivalent geofence boundaries may have the same radius, shape, etc. Aggregating may include, for example, finding average performance metrics, finding median performance metrics, etc.

In some examples, the geofence engine 20 may determine the predicted performance of the initial geofence boundary considering a derived relationship between geofence boundary properties (e.g., radius, direction of breach, etc.) and performance for the reference geofence boundaries (e.g., response time, detection distance, etc.). For example, the relationship may be applied to the initial geofence boundary and produce a predicted performance of the initial geofence boundary. The geofence engine 20 may derive the relationship in any suitable manner. In some examples, the geofence engine 20 may apply a curve-fitting technique to the reference geofence boundaries and associated geofence boundary breach data. Example curve-fitting techniques include linear or non-linear regression, a least squares method, etc. Relationships between geofence boundary properties and performance may be expressed in any suitable manner including, for example, as an equation, as a look-up table, etc. In some examples, the geofence engine 20 may derive relationships between geofence boundary properties and performance that consider additional variables such as, time of day, weather conditions, etc. For example, the ability to determine the location of the mobile devices 14a, 14b, 14n may depend on these and other additional factors as well as geofence boundary properties.

Figure 6:
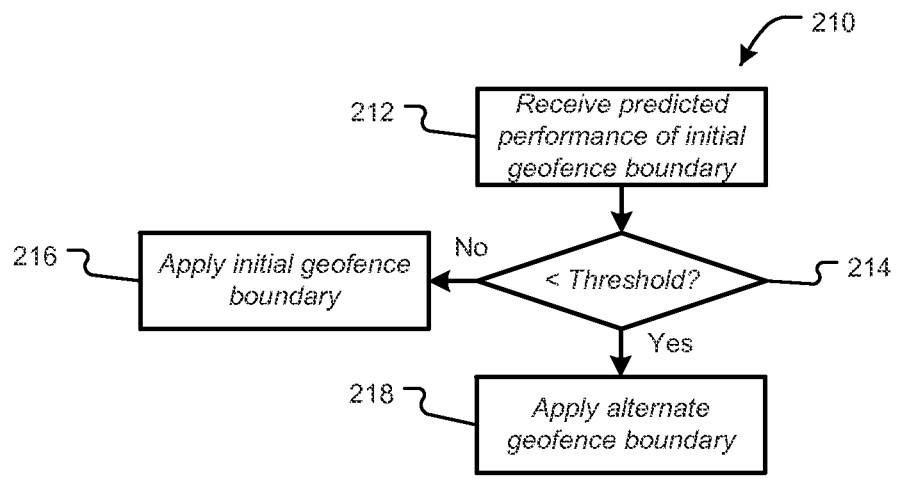
FIG. 6 is a flowchart showing one example of a process flow for modifying an initial geofence boundary considering geofence breach data from reference geofence boundaries.

At step 208, the geofence engine 20 may modify the initial geofence boundary. The modifying may be performed automatically (e.g., without input from a user 12) and/or may be performed based on an instruction received from the user 12. FIG. 6 is a flowchart showing one example of a process flow 210 for modifying an initial geofence boundary considering geofence breach data from reference geofence boundaries. For example, the process flow 210 illustrates one way that the geofence engine 20 may modify geofence boundary data at step 208. At step 212, the geofence engine 20 may receive a predicted performance of an initial geofence boundary. The predicted performance may be determined in any suitable manner including, for example, as described herein with respect to FIG. 5. At step 214, the geofence engine 20 may determine whether the predicted performance of the initial geofence boundary is less than a threshold performance. For example, good geofence boundary performance may be associated with relatively lower response times and/or detection distances. Poor geofence boundary performance may be associated with relatively higher response times and/or detection distances. The performance threshold may be, for example, a threshold detection distance (e.g., 5 meters) and/or a threshold response time. In some examples, the performance threshold may vary based on the type of transportation that the user 12a, 12b, 12n is expected to use when breaching the boundary. For example, the threshold response time for a boundary expected to be breached by car, bus, train, or other fast-moving transport may be less than for a boundary expected to be breached on foot. In some examples, the user 12a, 12b, 12n may set the threshold performance directly or indirectly. For example, a user 12a, 12b, 12n may directly set a threshold performance or may set the threshold performance indirectly by prioritizing the associated geofence boundary.

If the predicted performance of the initial geofence boundary is not less than the threshold (e.g., greater than or equal to the threshold), then the geofence engine 20 may not modify the initial geofence boundary. For example, the geofence module 20 may, at step 216, begin to apply or continue to apply the initial geofence boundary. In some examples, the corresponding mobile device 14a, 14b, 14n may apply the alternate geofence boundary and/or the geofence engine 20 may apply the alternate geofence boundary with the corresponding mobile device 14a, 14b, 14n.

If the predicted performance is less than the threshold, then the geofence engine 20 may, at step 218, apply an alternate geofence boundary. In some examples, the corresponding mobile device 14a, 14b, 14n may apply the alternate geofence boundary and/or the geofence engine 20 may apply the alternate geofence boundary with the corresponding mobile device 14a, 14b, 14n. The alternate geofence boundary may be a geofence boundary with superior performance than the initial geofence boundary (e.g., a shorter detection distance and/or response time). The geofence engine 20 may select the alternate geofence boundary in any suitable manner. For example, the geofence engine 20 may utilize the relationship between geofence boundaries and performance that may be derived as described with respect to FIG. 5. In some examples, the geofence engine 20 may find a maximum and/or minimum of the relationship to identify geofence boundary properties having the highest performance. For example, as described herein, the relationship may be expressed as an equation representing a curve. Finding the maximum or minimum of the relationship may involve finding a maximum or minimum of the curve. Also, as described herein, the relationship may be expressed as a look-up table. Finding the maximum or minimum of look-up table may involve finding the highest (or lowest) performance value and a corresponding geofence boundary property. The maximum or minimum may be local or absolute. The alternate geofence boundary may have the same or similar properties. In other examples, the alternate geofence boundary may have properties associated with the best average performance among reference geofence boundaries (e.g., the lowest response time and/or detection distance).

Figure 7:
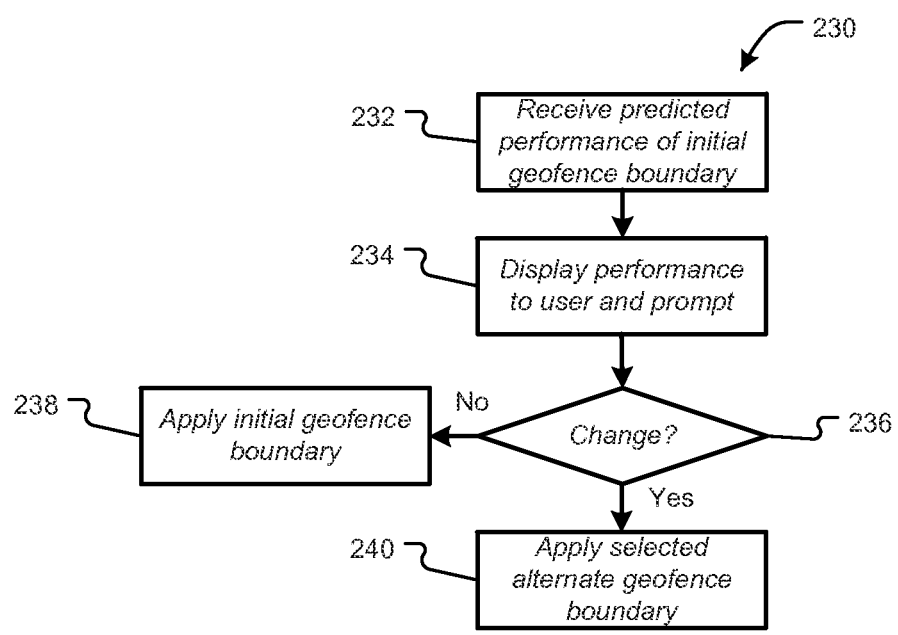
FIG. 7 is a flow chart showing one example of a process flow for modifying an initial geofence boundary based on a user prompt.

FIG. 7 is a flow chart showing one example of a process flow 230 for modifying an initial geofence boundary based on a user prompt. At step 232, the geofence engine 20 may receive a predicted performance of an initial geofence boundary, for example, similar to 212 above. At step 234, the geofence engine 20 may display the performance of the initial geofence boundary at the mobile device 14a, 14b, 14n and prompt the user 12a, 12b, 12n to instruct whether to keep the initial geofence boundary or select an alternate geofence boundary. The performance maybe displayed in any suitable format including, for example, as a graphical user interface provided to a display component 106 of the device (FIG. 3). In some examples, one or more alternate geofence boundaries may also be displayed to the user 12a, 12b, 12n via the mobile device 14a, 14b, 14n. The alternate geofence boundaries may have a performance higher than that of the initial geofence boundary. For example, the predicted performance of the alternate geofence boundaries may also be displayed. The user 12a, 12b, 12n may select from the initial geofence boundary and one or more alternate geofence boundaries. In some examples, the geofence engine 20 may cause a mobile device 14a, 14b, 14n to display data and/or prompt a user 12a, 12b, 12n to provide input by transmitting a request to the relevant mobile device 14a, 14b, 14n indicating the data to be displayed and/or the prompt to be made.

If the user 12a, 12b, 12n selects the initial geofence boundary at step 236, then the geofence engine 20 may not modify the initial geofence boundary. For example, the geofence module 20 may, at step 238, begin to apply or continue to apply the initial geofence boundary. In some examples, the corresponding mobile device 14a, 14b, 14n may apply the alternate geofence boundary and/or the geofence engine 20 may apply the alternate geofence boundary with the corresponding mobile device 14a, 14b, 14n. If the user selects one of the alternate geofence boundaries, then the geofence engine 20 may apply the selected alternate geofence boundary at step 240. In some examples, the corresponding mobile device 14a, 14b, 14n may apply the alternate geofence boundary and/or the geofence engine 20 may apply the alternate geofence boundary with the corresponding mobile device 14a, 14b, 14n.

In some examples, the geofence engine 20 may execute a hybrid of the process flows 210 and 230. For example, the geofence engine 20 may determine whether to automatically modify the initial geofence boundary, or do so based on instructions from the user, considering the performance of the initial geofence boundary. If the initial geofence boundary has a performance below a lower threshold, the geofence engine 20 may automatically update the initial geofence boundary to a higher performing alternate geofence boundary, as described in the process flow 210. If the initial geofence boundary has a performance between the lower threshold and an upper threshold, the geofence engine 20 may prompt the user 12 to determine whether to modify the initial geofence boundary, as described in the process flow 230. If the initial geofence boundary has a performance above the upper threshold, the geofence engine 20 may not modify the initial geofence boundary.

In some examples, in addition to or instead of modifying an initial geofence boundary, the geofence engine 20 may be programmed to select an alternate POI. For example, if the predicted performance of geofence boundaries for the initial POI is less than a desired threshold, and there exists an alternate POI having geofence boundaries with superior predicted performance, the geofence engine 20 may select and apply the alternate POI and an alternate geofence boundary for the alternate POI. Selecting an alternate POI may be useful in many different contexts. In some examples, the initial POI may be a gas station, coffee shop or other retail location. For example, the responsive action when the mobile device 14a, 14b, 14n breaches a geofence boundary for the POI may involve, for example, an alert to the user 12a, 12b, 12n that he or she is near a gas station, an instruction to the coffee shop to begin preparing a particular drink for the user 12a, 12b, 12n, etc. The alternate POI may be a similar gas station, coffee shop or other retail location with superior performing geofence boundaries, allowing the user to better utilize geofencing.

Figure 8:
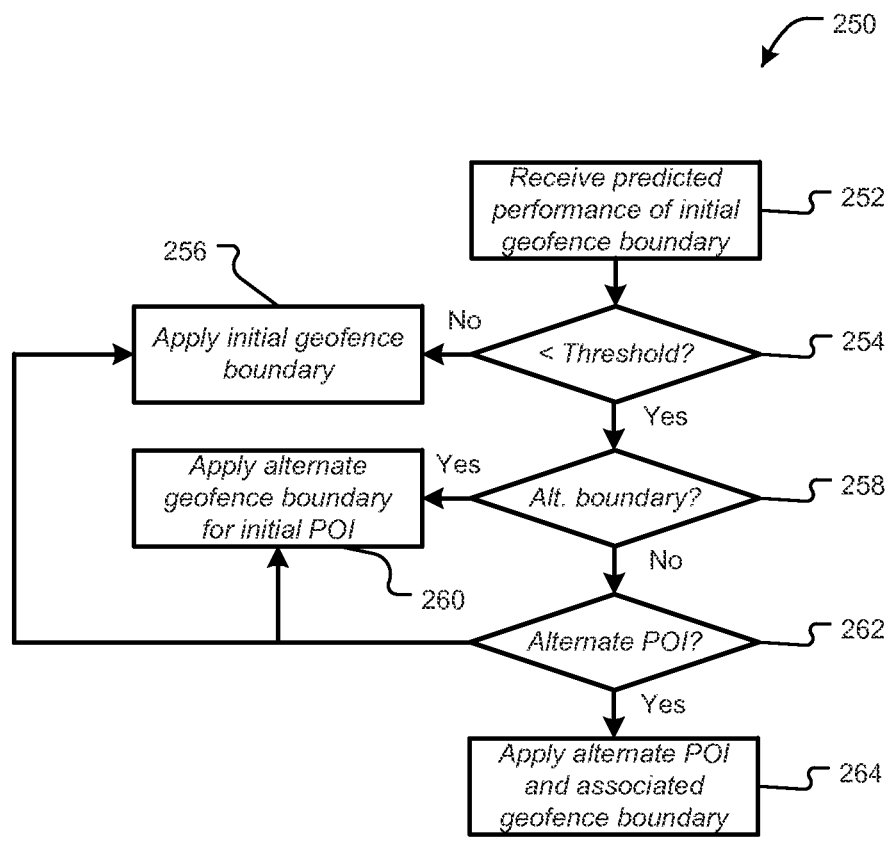
FIG. 8 is a flow chart showing one example of a process flow for selecting an alternate point of interest (POI).

FIG. 8 is a flow chart showing one example of a process flow 250 for selecting an alternate POI. At step 252, the geofence engine 20 may receive predicted performance information of an initial geofence boundary for an initial POI, for example, similar to 212 and 232 described above. At step 254, the geofence engine 20 may determine if the predicted performance of the initial geofence boundary is less than a performance threshold. If the predicted performance of the initial geofence boundary is not less than the performance threshold, then the geofence engine 20 may apply the initial geofence boundary at step 256. In some examples, the corresponding mobile device 14a, 14b, 14n may apply the alternate geofence boundary and/or the geofence engine 20 may apply the alternate geofence boundary with the corresponding mobile device 14a, 14b, 14n.

If the predicted performance of the initial geofence boundary is less than the threshold, the geofence engine 20 may determine, at step 258, whether there is an alternate geofence boundary for the initial POI that does exceed the threshold performance. If yes, then the geofence engine 20 may apply the alternate geofence boundary for the initial POI at step 260. In some examples, the corresponding mobile device 14a, 14b, 14n may apply the alternate geofence boundary and/or the geofence engine 20 may apply the alternate geofence boundary with the corresponding mobile device 14a, 14b, 14n. If no, then the geofence engine 20 may determine, at step 262, whether there is an alternate POI. In some examples, the alternate POI may be of the same type as the initial POI; within a threshold distance of the initial POI; and/or associated with at least one geofence boundary having a predicted performance superior to that of the initial geofence boundary. The type of a POI may be determined in any suitable manner. For example, if the initial POI is a retail location, other POIs of the same type may include retail locations that sell goods or services of the same kind as the initial POI, other retail locations in a common chain with the initial POI, etc. The threshold distance may be any suitable distance. In some examples, the threshold distance may be a radius of the initial geofence boundary. The performance of geofence boundaries associated with an alternate POI or potential alternate POI may be determined, for example, by examining reference geofence boundaries for the alternate POI and determining their predicted performance.

If no alternate POIs are found at step 262, then the geofence engine 20 may, for example, apply the initial geofence boundary for the initial POI at step 256 or apply an alternate geofence boundary for the initial POI at step 260. The alternate geofence boundary for the initial POI may be determined, for example, as described herein with respect to process flows 210 and 230. If an alternate POI is found at step 262, the geofence engine 20 may apply the alternate POI with an associated geofence boundary at step 264. In some examples, the corresponding mobile device 14a, 14b, 14n may apply the alternate geofence boundary and/or the geofence engine 20 may apply the alternate geofence boundary with the corresponding mobile device 14a, 14b, 14n. The geofence boundary applied with the alternate POI may be any suitable boundary. For example, it may be the geofence boundary associated with the alternate POI that has the highest predicted performance, the geofence boundary associated with the alternate POI that is most similar to the initial geofence boundary for the initial POI, etc.

In some examples, the geofence engine 20 may omit one or more of decisions 254, 258 or 262. Instead, the geofence engine 20 may determine all or a portion alternate geofence boundaries associated with the initial POI and all or a portion of alternate geofence boundaries associated with one or more alternate POIs. The geofence engine 20 may the select the geofence boundary with the best predicted performance. The POI associated with the selected geofence boundary (e.g., the initial POI or an alternate POI) may be applied.

In some examples, the geofence engine 20 may be programmed to create and/or apply a geofence performance map for a geographic area. The geofence performance map may be created by aggregating geofence boundary breach data associated with different POIs in the geographic area and may provide an indication of the likelihood that a mobile device 14a, 14b, 14n will be successfully located at different points in the geographic area. A geofence performance map may be used to evaluate or improve geofence boundaries instead of or in addition to finding reference geofence boundaries, as described herein. For example, geofence performance maps may be used in areas where geofence use is sparse (e.g. areas where there may are not enough mobile devices 14a, 14b, 14n with active geofences to generate a meaningful number of reference geofence boundaries).

Figure 9:
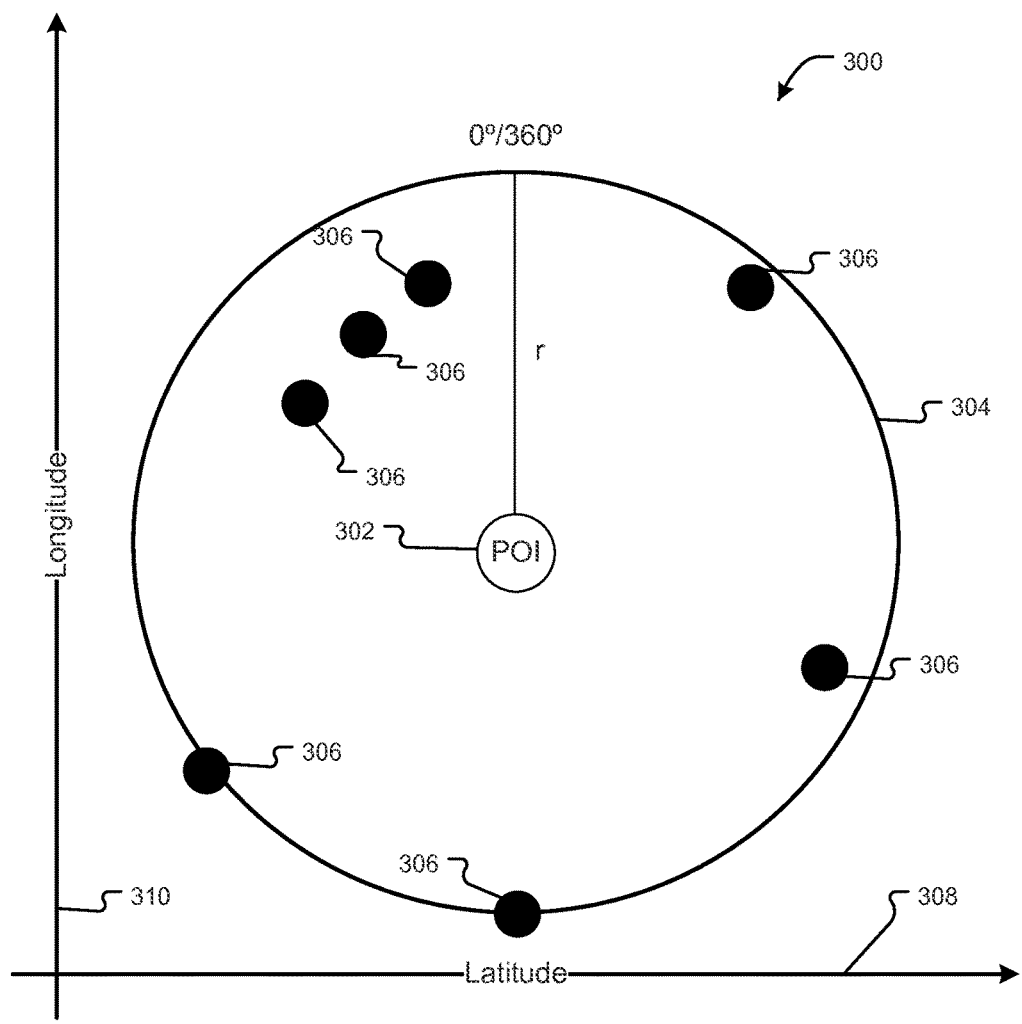
FIG. 9 is a diagram showing one example of geofence boundary breach data that may be collected for an example geofence boundary associated with an example POI.

FIG. 9 is a diagram 300 showing one example of geofence boundary breach data that may be collected for an example geofence boundary 304 associated with an example POI 302. In FIG. 9, the example geofence boundary 304 has a constant radius, indicated by r. Directional positions on the geofence boundary 304 may be measured as an angle with one direction corresponding to 0°/360°, as shown. The directions indicated on FIG. 9 may relate to the cardinal directions in any suitable manner. For example, 0° may correspond to north or any other suitable direction. FIG. 9 also shows geofence boundary breach events 306 associated with the geofence boundary 304 and POI 302. Each geofence boundary breach event 306 may correspond to one instance where the mobile device 14a, 14b, 14n associated with the geofence boundary 304 crossed the boundary 304 (e.g., accompanied by user 12a, 12b, 12n). The geofence engine 20 may receive or otherwise collect boundary breach data associated with each boundary breach event 306. For example, each boundary breach event 306 may be described by a corresponding response time and/or detection distance. Each boundary breach event 306 may occur at a geographic location (e.g., described by a latitude and longitude indicated on axes 308, 310). The geographic location of a boundary breach event may be found by the geofence engine 20 and/or the associated mobile device 14a, 14b, 14n. As illustrated in FIG. 9, not all of the geofence boundary breach events 306 are shown at the boundary 304, for example, as some of the geofence boundary breach events 306 are associated with a detection distance (e.g., a distance that the user 12a, 12b, 12n and/or mobile device 14a, 14b, 14n traveled before the breach event was detected).

Figure 10:
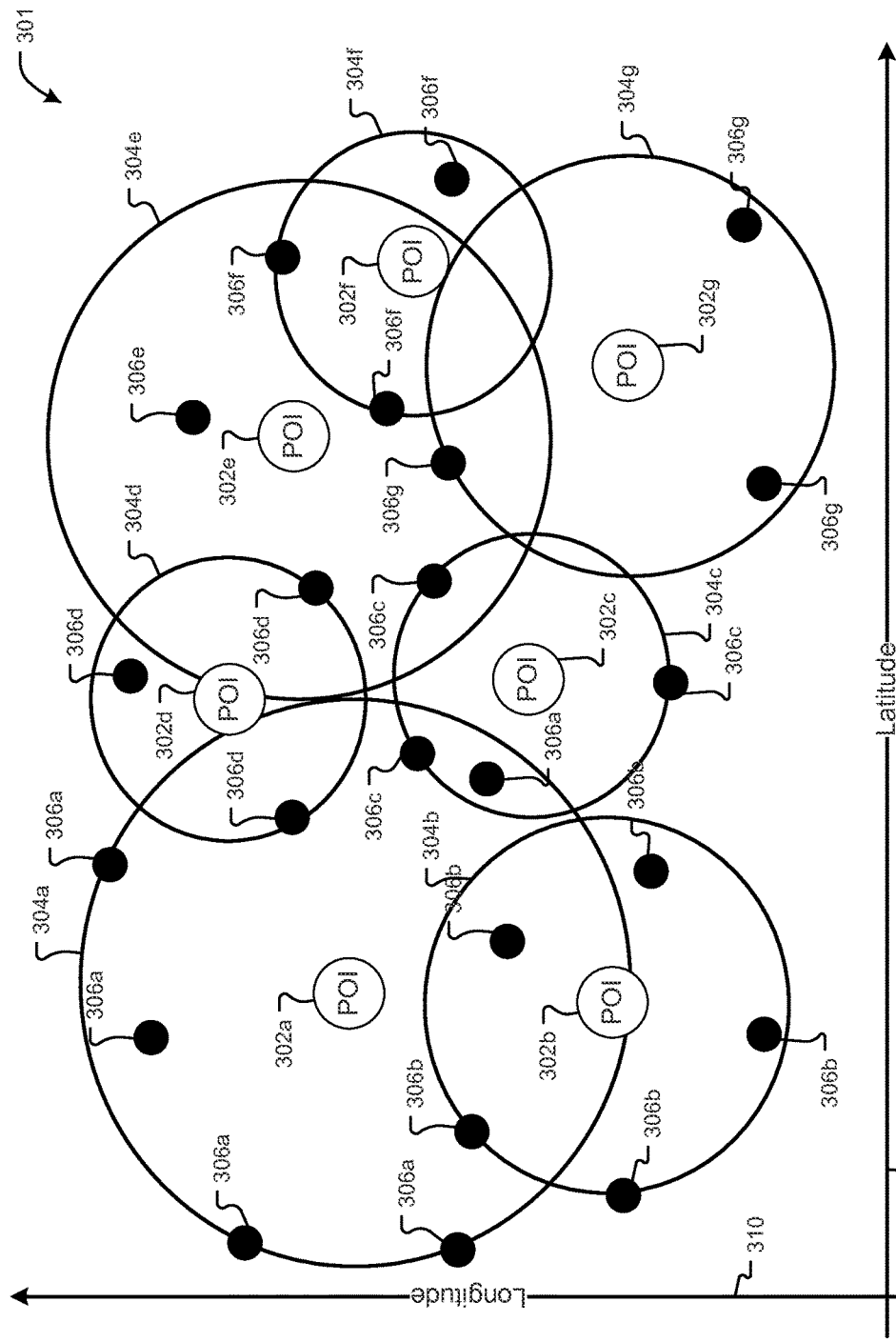
FIG. 10 is a diagram showing one example of geofence boundary breach data collected for a series of geofence boundaries that may be used to generate a geofence performance map for a geographic area.

FIG. 10 is a diagram 301 showing one example of geofence boundary breach data collected for a series of geofence boundaries 304a, 304b, 304c, 304d, 304e, 304f, 304g that may be used to generate a geofence performance map for a geographic area. Each of the geofence boundaries 304a, 304b, 304c, 304d, 304e, 304f, 304g may be associated with a POI 302a, 302b, 302c, 302d, 302e, 302f, 302g. Example boundary breach events 306a, 306b, 306c, 306d, 306e, 306f, 306g for each geofence boundary 304a, 304b, 304c, 304d, 304e, 304f, 304g are shown. The geofence boundaries 304a, 304b, 304c, 304d, 304e, 304f, 304g shown in FIG. 10 may be associated with a common mobile device 14a, 14b, 14n and/or with different mobile devices 14a, 14b, 14n. As described with respect to FIG. 9, each boundary breach event 306a, 306b, 306c, 306d, 306e, 306f, 306g may have associated geofence breach data (e.g., a response time and/or detection distance). Each boundary breach event 306a, 306b, 306c, 306d, 306e, 306f, 306g may also be associated with a geographic location (e.g., described by a latitude and longitude indicated on axes 308, 310).

Figure 11:
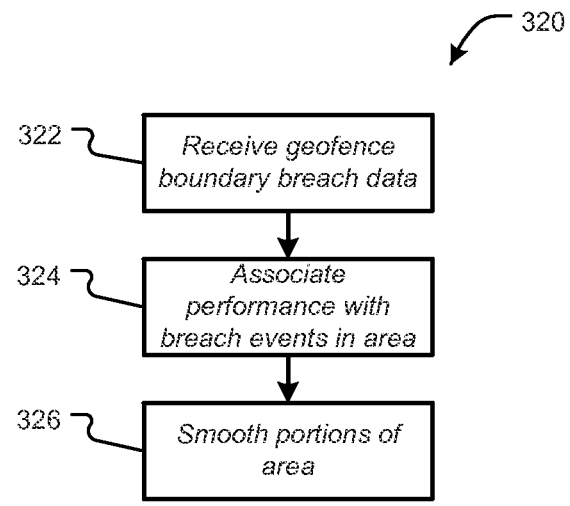
FIG. 11 is a flow chart showing one example of a process flow that may be executed by the geofence engine to derive a geofence performance map for a geographic area.

FIG. 11 is a flow chart showing one example of a process flow 320 that may be executed by the geofence engine 20 to derive a geofence performance map for a geographic area. At step 322, the geofence engine 20 may receive geofence boundary breach data. The geofence boundary breach data may describe one or more boundary breach events, such as 306a, 306b, 306c, 306d, 306e, 306f, 306g, in the geographic area to be mapped. The boundary breach data may include, for each boundary breach event, a performance metric (e.g., a detection distance and/or a response time) and a geographic location of the boundary breach event. At step 324, the geofence engine may associate a performance with locations in the geographic area. For example, each location corresponding to at least one boundary breach event may be assigned a performance based on the performance of the corresponding boundary breach event. Locations may be defined in any suitable manner. For example, some locations may be a point (e.g., a latitude and longitude value). Some locations may be of a defined size and shape. In some example, one or more locations may correspond to geographic units. If more than one boundary breach has occurred at the same location, the geofence engine 20 may determine an aggregate performance for the location, for example, by finding an average and/or median response time and/or detection distance from among the boundary breach events at the location. At step 326, the geofence engine 20 may derive predicted performances for portions of the geographic area that do not have associated boundary breach events. For example, the geofence 20 may apply any suitable smoothing or extrapolation algorithm to extrapolate performances for some or all of the remaining portions of the geographic area. Any suitable algorithm may be used. For example, the geofence engine 20 may extrapolate performances for the remaining portions of the geographic area by taking a weighted average of known performances, where the weighting at each point of the remaining portions corresponds to the distance between the point and the respective known performances. A result of the process flow 320 may be a performance map that maps a predicted geofence performance to various locations in the geographic area.

Figure 12:
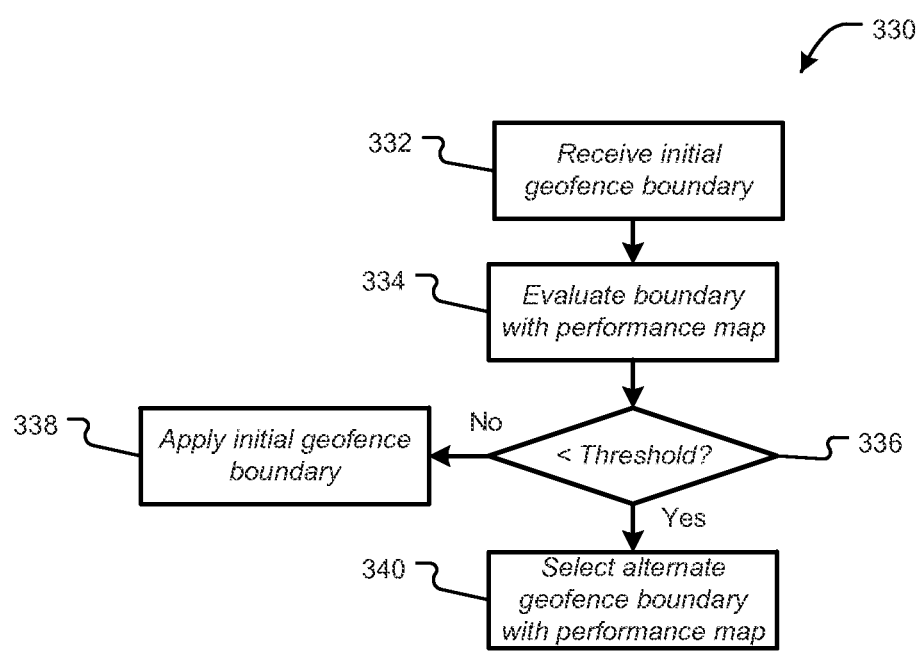
FIG. 12 is a flow chart showing one example of a process flow that may be executed by the geofence engine to modify geofence boundaries utilizing a performance map.

FIG. 12 is a flow chart showing one example of a process flow 330 that may be executed by the geofence engine 20 to modify geofence boundaries utilizing a performance map. At step 332, the geofence engine 20 may receive an initial POI and an initial geofence boundary. The geofence engine 20 may receive the initial POI and initial geofence boundary at step 332 at any suitable time. In some examples the geofence engine 20 may receive the initial POI and initial geofence boundary before the geofence is applied. In other examples, the geofence engine 20 may receive the initial POI and initial geofence boundary after the geofence is in use. At step 334, the geofence engine 20 may evaluate the initial geofence boundary with a performance map, such as the performance map derived as illustrated in FIGS. 9-11. For example, the geofence engine 20 may evaluate the performance of one or more geographic locations falling on the initial geofence boundary by determining the performance of the one or more geographic locations as indicated on the performance map. In this way, the geofence engine 20 may determine a predicted performance of the geofence boundary. The predicted performance may be derived from the performance map in any suitable manner. For example, the predicted performance may be an aggregation (e.g., average or median) of the performances of locations on the initial geofence boundary that are also associated with a performance on the performance map.

At step 336, the geofence engine 20 may determine whether the performance of the initial geofence boundary is less than a threshold performance. The threshold performance may be determined in any suitable manner. For example, the threshold performance may represent an aggregate performance over the initial geofence boundary. For example, the threshold may comprise an aggregate threshold value compared to an aggregate (e.g., average and/or median) performance of locations making up the initial geofence boundary. In additional to or instead of the aggregate threshold value, the threshold may comprise a minimum threshold value. For example, if more than a threshold number of locations on the initial geofence boundary have a performance that is less than the minimum threshold value, the initial geofence boundary may be less than the threshold. The geofence engine 20 may apply different types of threshold values (e.g., aggregate threshold values, minimum threshold values, etc.) at step 336 either alternatively or together. For example, the performance of the initial geofence boundary may be considered to be less than the threshold if it is less than any of the thresholds used.

If the performance of the initial geofence boundary is not less than the threshold at step 336, then the geofence engine 20 may apply the initial geofence boundary at step 338. If the performance of the initial geofence boundary is less than the threshold at step 336, then the geofence engine 20 may select one or more alternate geofence boundaries at step 340. The alternate geofence boundary may be selected utilizing the performance map. For example, the geofence engine 20 may select analyze one or more alternate geofence boundaries against the performance may in a manner similar to that described with respect to 334. The geofence engine 20 may apply an alternate geofence boundary in any suitable manner. For example, the geofence engine 20 may apply a best alternate geofence boundary (e.g., a boundary with the highest performance). In some examples, the geofence engine 20 may prompt the user to select an alternate geofence boundary to be applied, as described herein.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for modifying a geofence boundary based at least in part on reference geofence data, the method comprising:
   receiving, by a geofence engine and from a first mobile device, an indication of an initial point of interest (POI) and an indication of an initial geofence boundary, wherein the initial geofence boundary is a circle centered on the initial POI and having a first radius, and wherein the geofence engine comprises at least one processor and associated memory;
   identifying, by the geofence engine, a plurality of reference geofence boundaries, wherein each reference geofence boundary of the plurality of reference geofence boundaries is a circle centered on a reference POI at the same location as the initial POI;
   selecting, by the geofence engine and from the plurality of reference geofence boundaries, at least one equivalent geofence boundary having a second radius equal to the first radius of the initial geofence boundary;
   determining, by the geofence engine, that an observed response time for the at least one equivalent geofence boundary is greater than a threshold response time, wherein the observed response time of the at least one equivalent geofence boundary is a time between when a second mobile device crossed the at least one equivalent geofence boundary and when the geofence engine determined that the second mobile device crossed the at least one equivalent geofence boundary;
   selecting from the reference geofence boundaries an alternate geofence boundary, wherein the alternate geofence boundary has an observed response time less than the threshold response time, wherein the observed response time of the alternate geofence boundary is a time between when a third mobile device crossed the alternate geofence boundary and when the geofence engine determined that the third mobile device crossed the alternate geofence boundary; and
   applying the alternate geofence boundary for the first mobile device, wherein applying the alternate geofence boundary comprises:
      receiving a first location of the first mobile device at a first time and a second location of the first mobile device at a second time;
      determining that the alternate geofence boundary is between the first and second locations; and
      sending to the first mobile device an indication that the first mobile device has breached the alternate geofence boundary.

2. The method of claim 1, further comprising:
   determining, by the geofence engine, an average of a plurality of observed response times for the at least one equivalent geofence boundary; and
   determining that the average of the plurality of observed response times for the at least one equivalent geofence boundary is greater than the threshold response time.

3. The method of claim 1, further comprising generating a predicted response time for the initial geofence boundary, wherein the predicted response time is a predicted time between when the first mobile device crosses the initial geofence boundary and when the geofence engine determines that the first mobile device has crossed the initial geofence boundary, wherein generating the predicted response time comprises:
   determine an equation that relates values for at least one geofence boundary property to response times of geofence boundaries having corresponding values for the at least one geofence boundary properties; and
   solving the equation for at least one property of the initial geofence boundary.

4. A computer system for modifying a geofence boundary, comprising:
   a geofence engine comprising at least one processor and associated memory, wherein the geofence engine is programmed to:
      receive an indication of an initial geofence boundary for a first mobile device;
      receive geofence data from a second mobile device and a third mobile device, wherein the geofence data describes a plurality of geofence boundaries associated with the second mobile device and the third mobile device and a plurality of geofence boundary breach events associated with the plurality of geofence boundaries; and
      determine an alternate geofence boundary for the first mobile device based at least in part on the geofence data from the second mobile device and the third mobile device.

5. The system of claim 4, wherein the geofence engine is further programmed to:
   identify, from the plurality of geofence boundaries, a plurality of reference geofence boundaries, wherein the plurality of reference geofence boundaries have reference POIs within a threshold distance of an initial POI of the initial geofence boundary; and
   determine a predicted performance for the initial geofence boundary.

6. The system of claim 5, wherein determining the predicted performance of the initial geofence boundary comprises aggregating observed performances of a set of the plurality of reference geofence boundaries that are equivalent to the initial geofence boundary.

7. The system of claim 5, wherein determining the predicted performance of the initial geofence boundary comprises:
   deriving a relationship between at least one geofence boundary property and geofence boundary performance based at least in part on the plurality of reference geofence boundaries and the geofence boundary breach events associated with the reference geofence boundaries; and
   applying the relationship to at least one property of the initial geofence boundary.

8. The system of claim 5, wherein the geofence engine is further programmed to:
   determine that the predicted performance for the initial geofence boundary is inferior to a threshold performance.

9. The system of claim 8, wherein determining the alternate geofence boundary comprises selecting a reference geofence boundary having a performance superior to the predicted performance for the initial geofence boundary.

10. The system of claim 4, wherein determining the alternate geofence boundary comprises:
   finding a maximum of a relationship between at least one geofence boundary property and geofence boundary performance; and
   selecting the alternate geofence boundary having a geofence boundary property that is equivalent to a geofence boundary property at the maximum.

11. The system of claim 4, wherein the geofence engine is further programmed to apply the alternate geofence boundary, wherein applying the alternate geofence boundary comprises:
   receiving a first location of the mobile device at a first time and a second location of the mobile device at a second time;
   determining that the alternate geofence boundary is between the first and second locations; and
   sending to the mobile device an indication that the mobile device has breached the alternate geofence boundary.

12. The system of claim 4, wherein the geofence engine is further programmed to:
   display at a mobile device an indication of the initial geofence boundary, an indication of a predicted performance of the initial geofence boundary, an indication of an alternate geofence boundary, and an indication of a performance of the alternate geofence boundary; and
   receive from the mobile device a selection of either the initial geofence boundary or the alternate geofence boundary.

13. The system of claim 4, wherein the geofence engine is further programmed to:
   determine that a predicted performance for the initial geofence boundary is inferior to a threshold performance;
   display the initial geofence boundary and the alternate geofence boundary at a mobile device; and
   receive from the mobile device an indication of either the initial geofence boundary or the alternate geofence boundary.

14. The system of claim 4, wherein the geofence engine is further programmed to:
   determine that a predicted performance for the initial geofence boundary is inferior to a threshold performance; and
   identify a an alternate POI and an associated alternate geofence boundary.

15. The system of claim 14, wherein the alternate POI is of a same type as an initial POI associated with the initial geofence boundary, wherein the alternate POI is within a threshold distance of the initial POI, wherein the threshold distance is equal to a radius of the initial geofence boundary, and wherein a predicted performance of the alternate geofence boundary is superior to the predicted performance of the initial geofence boundary.

16. A computer system for modifying a geofence boundary, the system comprising:
   a geofence engine, wherein the geofence engine comprises at least one processor and associated memory, wherein the geofence engine is programmed to:
      receive geofence boundary breach data for a plurality of mobile devices;
      derive a performance map for a geographic area based at least in part on the geofence boundary breach data, wherein the performance map describes a predicted geofence breach detection performance for a plurality of locations in the geographic area; and
      select a geofence boundary based at least in part on the performance map.

17. The system of claim 16, wherein the boundary breach data comprises, for each of a plurality of boundary breach events, a performance metric for the boundary breach event and a location of the boundary breach event, wherein the location of the boundary breach data is selected from the plurality of locations in the geographic area.

18. The system of claim 17, wherein deriving the performance map for the geographic area comprises assigning a first performance to a first location selected from the plurality of locations, wherein at least one boundary breach event has occurred at the first location, and wherein the assigning is based at least in part on an observed performance of the at least one boundary breach event.

19. The system of claim 18, where deriving the performance map for the geographic area further comprises assigning a second performance to a second location selected from the plurality of locations, wherein the geofence boundary breach data does not describe any boundary breach events that have occurred at the first location, and wherein the second performance is extrapolated from at least one other location from the plurality of locations.

20. The system of claim 16, wherein the geofence engine is further programmed to:
   receive from a first mobile device an initial POI and an initial geofence boundary; and
   determine a predicted performance of the initial geofence boundary at least in part based on the performance map.

* * * * *